June 4, 1957
C. R. BROWN
2,794,317
JET PROPULSION NOZZLE APPARATUS
Filed Nov. 8, 1951.
2 Sheets-Sheet 1
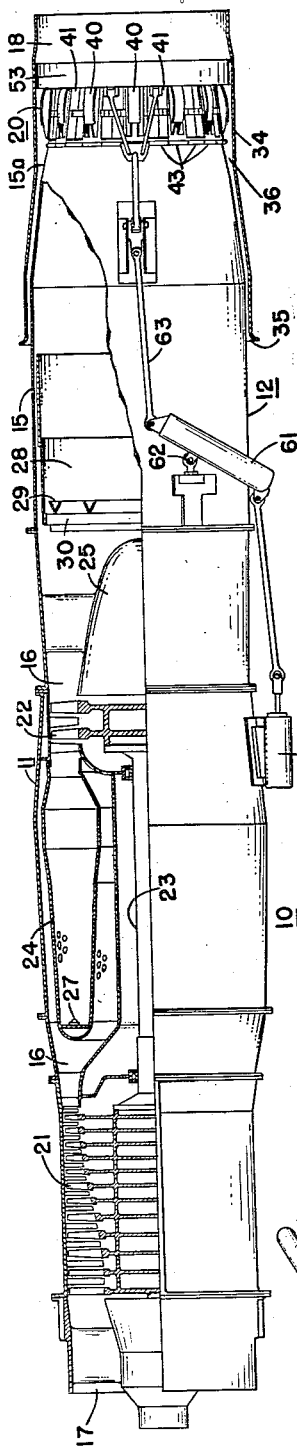
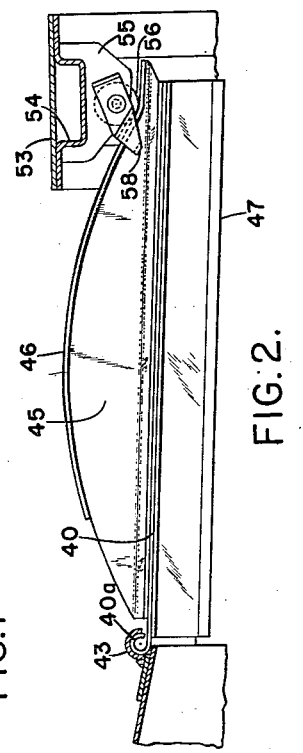
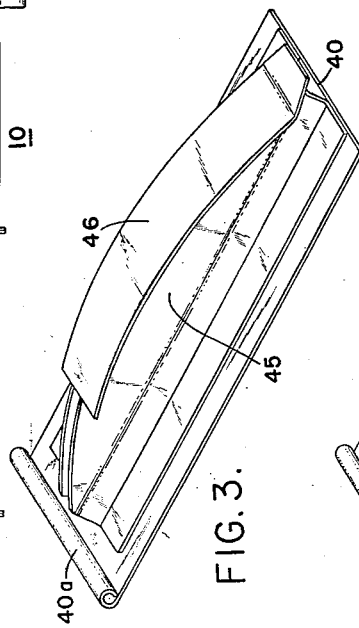
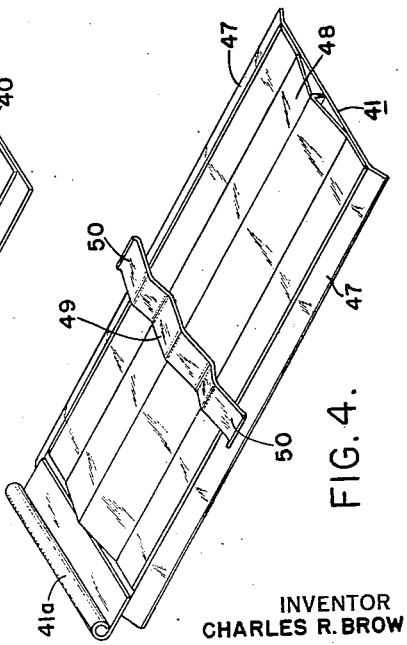
INVENTOR
CHARLES R. BROWN
BY
Ralph T. French
ATTORNEY June 4, 1957  C. R. BROWN  2,794,317
JET PROPULSION NOZZLE APPARATUS Filed Nov. 8, 1951  2 Sheets-Sheet 2

WITNESSES:
John M. Wright
V. W. Novak

INVENTOR
CHARLES R. BROWN
BY
Ralph T. French
ATTORNEY

United States Patent Office 2,794,317
Patented June 4, 1957

2,794,317
JET PROPULSION NOZZLE APPARATUS

Charles R. Brown, Glen Mills, Pa., assignor to Westinghouse Electric Corporation, East Pittsburgh, Pa., a corporation of Pennsylvania Application November 8, 1951, Serial No. 255,461

4 Claims. (Cl. 60—35.6)

This invention relates to jet propulsion power plants, and particularly to variable area nozzle equipment for an aviation power plant of that character.

It has been proposed to equip the exhaust portion of an aviation gas turbine engine with variable area means comprising an annular arrangement of outwardly and inwardly movable vanes or leaf elements adapted to define a substantially circular nozzle opening, and actuating means cooperative with each of the vanes simultaneously for selectively increasing or reducing the nozzle flow area. Operation of such apparatus by application of a motivating means to each of the leaves may tend to cause minor distortions of the leaves and associated elements of the nozzle assembly, and may thus promote undesirable leakage of motive fluid due to nonpositive sealing between a few of the leaves in certain positions of the apparatus. It is an object of the present invention to provide improved variable area nozzle apparatus constructed and arranged to minimize such leakage inducing characteristics.

Another object of the invention is the provision of improved variable area nozzle gate structure including alternate power operated outer leaves and inner floating leaves arranged in sealing engagement therewith, the floating leaves being relatively free to compensate for minor distortions when urged outwardly against the power operated leaves by the pressure of gases flowing through the nozzle.

These and other objects are effected by the invention as will be apparent from the following description and claims taken in connection with the accompanying drawing, forming a part of this application, in which:

Fig. 1 is a longitudinal schematic view, partly in section, of a typical aviation gas turbine power plant equipped with variable area nozzle apparatus constructed in accordance with the invention;

Fig. 2 is a fragmentary enlarged detail view of one of the power operated vanes or leaf elements of the apparatus shown in Fig. 1;

Fig. 3 is a perspective view of a power operated leaf element such as that shown in Fig. 2;

Fig. 4 is a similar perspective view of one of the floating or inner leaf elements adapted for cooperation with the power operated leaves.

Figure 5:
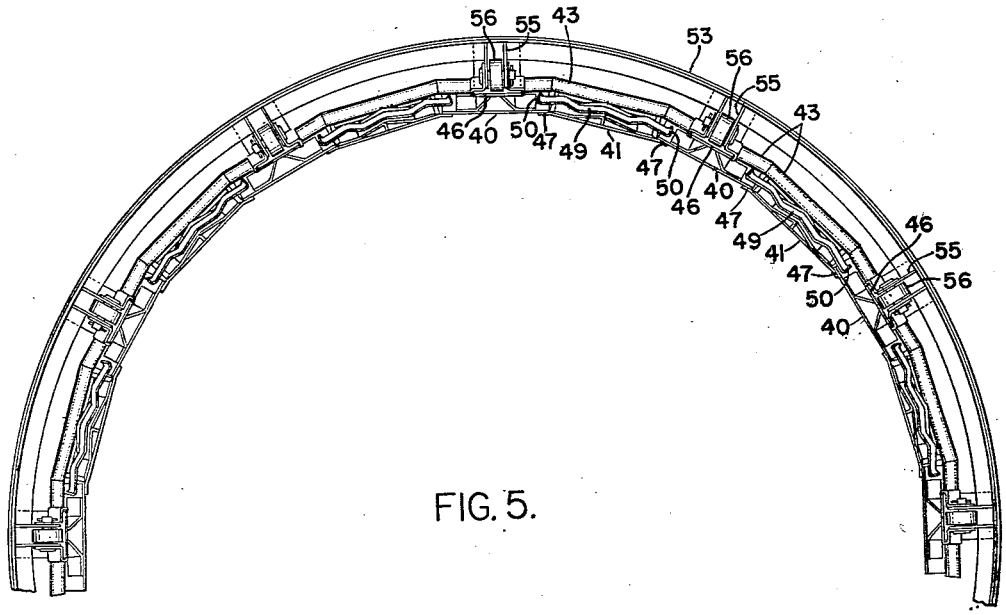
Figs. 5 and 6 are enlarged detail end views of the nozzle assembly shown in Fig. 1, illustrating a full flow area position and a reduced flow area position thereof, respectively.

As shown in Fig. 1 of the drawings, a typical aircraft turbojet power plant may comprise a gas turbine engine 10 having a generally cylindrical outer casing 11, and an afterburner 12 having a casing structure 15 suitably bolted to the casing 11. The casing sections of the power plant thus provide a continuous flow passageway 16, which extends from an air inlet 17 formed in the engine casing 11, to a rearwardly directed gas discharge nozzle 18 formed in the casing structure 15 of the afterburner and having a flow area that is variable by adjustment of movable nozzle gate apparatus 20, hereinafter more fully described. The usual operating elements of the engine 10 are disposed in generally axial alignment in the casing 11 and include an axial-flow compressor 21, a gas turbine 22 drivingly connected thereto by means of a shaft 23, and annular main combustion apparatus 24 which is interposed in passageway 16 between the compressor discharge and the turbine inlet. A flow guiding fairing or cone 25 may be supported downstream of the turbine within the casing structure 15, as shown. Suitable fuel nozzles 27 may be mounted in the upstream end of the combustion apparatus 24.

The space within the afterburner casing 15 communicating with the passageway 16 constitutes an afterburner combustion chamber indicated by the reference character 28, in which is mounted a flameholder device 29 and afterburner fuel nozzles 30 adapted to be supplied with fuel through the medium of a suitable control system (not shown), when thrust augmentation is desired.

In operation, air entering the inlet 17 is compressed and delivered by the compressor 21 to the combustion apparatus 24, where fuel continuously emitted from the nozzles 27 is initially ignited by electrical means (not shown) and burned to provide hot combustion gases for driving the turbine 22. If the afterburner 12 is not in operation, the gases expanded through the turbine may be conducted in unchanged state through the afterburner and expelled by way of the nozzle 18 in the form of a jet establishing a propulsive thrust sufficient for normal cruising service. During operation of the afterburner to provide increased thrust, however, the nozzles 30 are operative to supply fuel into the turbine exhaust gases, which include sufficient residual air to support further combustion and release of additional energy within the combustion chamber 28, thereby augmenting the thrust at the nozzle 18.

A cylindrical ejector shell 34 is preferably mounted in spaced encompassing relation about the nozzle gate apparatus 20, providing an annular upstream inlet 35 and passage 36 through which cooling air may be drawn by the ejector effect of the stream of exhaust gases, in order to prevent overheating of the nozzle structure when the power plant is enclosed in a compartment (not illustrated) of the aircraft.

Figure 6:
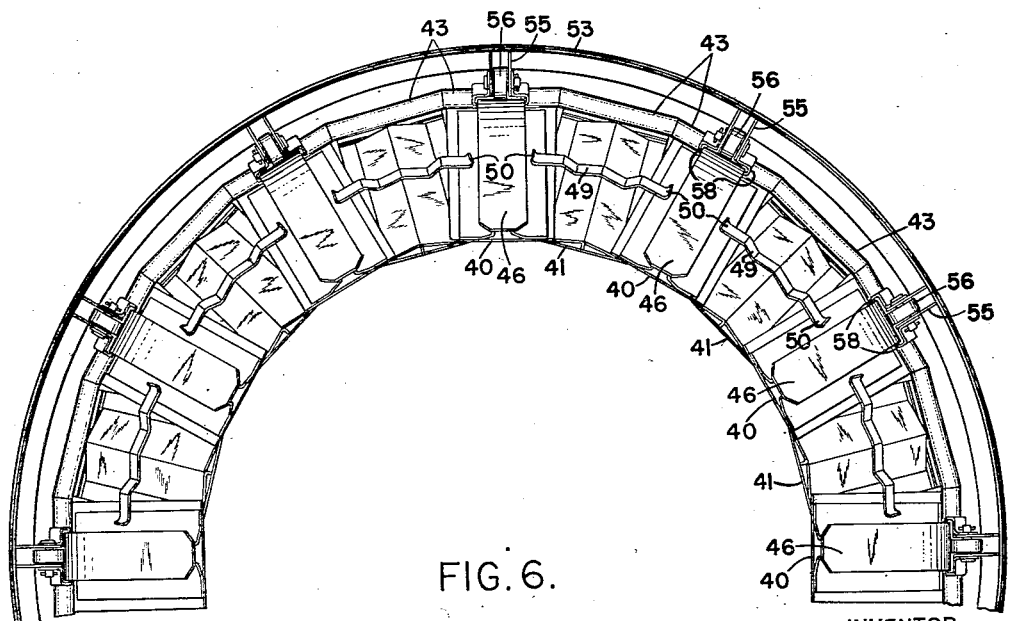

According to the invention, as may readily be understood by reference to Figs. 1 and 6, the nozzle gate apparatus 20 comprises an annular converging nozzle portion or extension 15a of the casing structure, and a plurality of interengaging power operated or master outer leaf elements 40 and floating or slave inner leaf elements 41 connected to and extending longitudinally beyond the extension 15a. For hinging the outer and inner leaf elements 40 and 41 to the nozzle portion 15a of the afterburner casing, a suitable number of tangentially disposed curved channel members 43 are formed on or welded to the peripheral edge of the nozzle portion 15a for receiving the rolled or formed upstream end portions 40a and 41a of the respective leaf elements, as best illustrated in Fig. 2.

Referring to Fig. 3, each of the outer leaf elements 40 has welded to the outer surface thereof an outwardly projecting cam flange structure 45 having a longitudinally disposed curved cam portion 46, which extends to the end of the leaf element opposite the rolled portion 40a. As shown in Fig. 4, each of the inner or floating leaf elements 41 has canted lateral sealing portions 47 formed longitudinally thereon, and is provided with outer reinforcing structure 48 to which is welded a transversely arranged metal strip or clip 49. Opposite ends 50 of the clip 49 project away from the reinforcing structure 48, and are adapted to overlap the edges of the adjacent outer leaf elements 40 when all of the leaf elements are assembled, as shown in Figs. 5 and 6. The sealing portions 47 of the floating inner leaf elements 41 are adapted to engage the underside surfaces of the respective outer leaf elements 40 to prevent leakage of the motive fluid passing through the nozzle. It will be understood that sufficient clearance may be provided at each of the restraining clips 49 to avoid interference thereof with free movement of the leaf elements, so that constant sealing engagement will be maintained between the outer leaf elements 40 and the sealing portions 47 of the inner leaf elements 41.

For actuating the assemblage of outer and inner leaf elements 40 and 41, there is provided an annular actuating member or unison ring 53 having an inner channel portion 54 and mounted in encompassing spaced relation about the leaf elements. A plurality of circumferentially spaced, inwardly projecting brackets 55 carrying rollers 56 are mounted on the channel portion of the actuating member 53, with the rollers in engagement with the respective cam portions 46. Each bracket 55 also carries a pair of guide lug members 58 which are adapted to straddle the adjacent cam flange structure 45 and to extend into alignment with the undersides of the cam portions 46 thereof, to limit inward movement of the associated leaf element relative to the annular actuating member 53.

A suitable motor device 60 (see Fig. 1) may be provided for selectively moving the annular actuating member 53 forwardly or backwardly through the medium of a semicircular yoke member 61 that is pivoted on pins 62 which are carried on opposite sides of the afterburner casing structure 15. The free ends of the yoke member 61 may be operatively connected to the actuating member 53 by means of suitable linkage, generally indicated by the reference character 63. It will be understood that the actuator 60 is constructed and arranged for response to operation of a suitable control apparatus (not shown) for effecting movement of the nozzle leaf or gate mechanism 20 to increase or reduce the nozzle flow area as desired.

It will thus be apparent that, with the annular group of floating inner leaf elements 41 urged outwardly under the pressure of gases issuing from the afterburner, so that the sealing portions 47 thereof are constantly maintained in engagement with under surfaces of the outer leaf elements 40, simultaneous operation of all the leaf elements to reduce the nozzle flow area will be effected upon movement of the annular actuating member 53 to the left, as viewed in Fig. 1, due to cooperation of the rollers 56 with the respective cam portions 46 of the outer leaf elements. Conversely, movement of the actuating member in the opposite direction will effect enlargement of the nozzle opening. When the power plant is inoperative, any tendency of the leaf elements to collapse inwardly will be prevented due to cooperation of the lugs 58 with the outer leaf elements, and engagement of the clips 49 with the outer leaf elements.

While the invention has been shown in but one form, it will be obvious to those skilled in the art that it is not so limited, but is susceptible of various changes and modifications without departing from the spirit thereof.

What is claimed is:

1. Variable area nozzle apparatus for a jet engine comprising casing structure forming a fluid discharge opening, a group of circumferentially spaced movable master leaf elements disposed longitudinally of and concentrically about the axis of said discharge opening, each of said master leaf elements extending axially beyond said discharge opening of the casing structure and having a flat inner surface and an elevated structure providing an outer cam surface, a group of circumferentially spaced movable slave leaf elements interposed between and inwardly of said master leaf elements, said slave leaf elements being similar in length to said master leaf elements and cooperative therewith to form a converging nozzle for said discharge opening, said slave leaf elements having marginal sealing surfaces formed thereon for sliding engagement with the inner surfaces of said master leaf elements, laterally extending clips secured to each of the leaf elements of one of the groups for projection into operative engagement with adjacent portions of the flanking leaf elements of the other of the groups, for limiting relative inward movement of said slave leaf elements in the absence of fluid pressure in the nozzle, and an annular actuating member encompassing both groups of leaf elements and cooperative with said cam surfaces on said master leaf elements to effect movement of both groups of leaf elements to vary the flow area of said nozzle, said slave leaf elements being held in sealing engagement with said master leaf elements by the pressure of fluid discharged through said opening.

2. Apparatus as set forth in claim 1 in which each leaf element of both groups comprises a rigid sheet metal assembly, and including separate hinge means securing each leaf element of both groups to said casing structure, said elevated structure having laterally projecting flanges in alignment with said cam surface, and a plurality of bracket assemblies carried by said actuating member in alignment with the respective master leaf elements, said bracket assemblies having lugs extending under said flanges and carrying rollers engaging said cam surfaces, respectively, said actuating member and bracket assemblies being shiftable in either direction axially of said nozzle for operating said leaf elements to vary the nozzle flow area.

3. In a variable area nozzle apparatus for a jet engine, tubular casing structure forming a fluid passageway and terminating in a converging nozzle, an annular group of circumferentially spaced inner leaf elements comprising rigid sheet metal assemblies extending longitudinally beyond said casing structure and having end portions hinged thereto, a concentric group of circumferentially spaced outer leaf elements comprising rigid sheet metal assemblies similarly hinged to said casing structure and interposed between said inner leaf elements, said inner leaf elements being subject to the radially outwardly directed pressure of fluid in said nozzle and having inwardly canted lateral sealing edge portions adapted to be overlapped and slidably engaged by the marginal portions of said outer leaf elements to define a substantially circular opening, a laterally extending clip secured to the outer surface of each of the inner leaf elements for projection into operative alignment with adjacent portions of the flanking outer leaf elements, for limiting relative inward movement of said inner leaf elements in the absence of fluid pressure in the nozzle, said outer leaf elements having elevated exterior cam surfaces formed thereon, and axially shiftable annular actuating means cooperative with said cam surfaces of the outer leaf elements for effecting variations in the nozzle flow area.

4. In a variable area nozzle apparatus for a jet engine, tubular casing structure forming a fluid passageway and terminating in a converging nozzle, an annular group of circumferentially spaced sheet metal assemblies constituting rigid inner leaf elements extending longitudinally beyond said casing structure and having end portions hinged thereto, a concentric group of circumferentially spaced sheet metal assemblies constituting outer leaf elements similarly hinged to said casing structure and interposed between said inner leaf elements, said inner leaf elements being subject to the radially outwardly directed pressure of fluid in said nozzle and having inwardly canted lateral sealing edge portions adapted to be overlapped and slidably engaged by the marginal portions of said outer leaf elements to define a substantially circular opening, said outer leaf elements each having an elevated cam structure providing an outer surface and carrying laterally projecting cam flanges aligned longitudinally thereof, an axially shiftable annular actuating member encompassing and spaced from said outer leaf elements, and a plurality of bracket assemblies carried thereby in alignment with the respective outer leaf elements, said bracket assemblies having lugs extending under said cam flanges and carrying rollers engaging the outer surfaces of said cam flanges, respectively, said actuating member and bracket assemblies being shiftable in either direction axially of said nozzle for operating said leaf elements to vary the nozzle flow area.

References Cited in the file of this patent

UNITED STATES PATENTS

| | | |
|---|---|---|
| 1,798,141 | Chillingworth | Mar. 31, 1931 |
| 2,462,953 | Eaton et al. | Mar. 1, 1949 |
| 2,496,509 | Wolf | Feb. 7, 1950 |
| 2,597,253 | Melchior | May 20, 1952 |
| 2,603,062 | Weiler et al. | July 15, 1952 |
| 2,641,104 | Estabrook | June 9, 1953 |
| 2,693,078 | Laucher | Nov. 2, 1954 |
| 2,697,907 | Gaubatz | Dec. 28, 1954 |

FOREIGN PATENTS

| | | |
|---|---|---|
| 30,130 | France | Dec. 3, 1925 |
| | (1st addition to 559,735) | |
| 162,381 | Switzerland | Sept. 1, 1933 |